United States Patent [19]

Wolowodiuk

[11] 4,192,373
[45] Mar. 11, 1980

[54] LEAK DETECTION SYSTEM FOR DUPLEX TUBE HEAT EXCHANGERS

[75] Inventor: Walter Wolowodiuk, New Providence, N.J.

[73] Assignee: Foster Wheeler Energy Corporation, Livingston, N.J.

[21] Appl. No.: 847,335

[22] Filed: Oct. 31, 1977

[51] Int. Cl.$^2$ .................... F24H 9/16; G01M 3/04
[52] U.S. Cl. ............................... 165/70; 176/19 LD
[58] Field of Search ............... 165/70; 176/19 LD, 68, 176/19 R; 73/343 R

[56] References Cited

U.S. PATENT DOCUMENTS

| | | | |
|---|---|---|---|
| 1,811,402 | 6/1931 | McNeal | 165/70 |
| 2,915,295 | 12/1959 | Boni, Jr. | 165/70 X |
| 2,979,451 | 4/1961 | Pettinger | 176/19 LD |
| 3,425,264 | 2/1969 | Frei | 165/70 X |
| 3,511,091 | 5/1970 | Thome | 73/343 R |

FOREIGN PATENT DOCUMENTS 2440532  6/1975  Fed. Rep. of Germany ............. 165/70

*Primary Examiner*—Charles J. Myhre
*Assistant Examiner*—Theophil W. Streule, Jr.
*Attorney, Agent, or Firm*—Marvin A. Naigur; John E. Wilson; John J. Herguth, Jr.

[57] ABSTRACT

A system for detecting leaks in a duplex tube heat exchanger. A tube sheet is provided with a plurality of straight bores passing laterally through the tube sheet, a number of channels connecting with each bore, each of the channels communicating with an annular space between the inner and outer walls of a duplex tube and an elongated probe adopted to be inserted into each of said bores to communicate with one of the channels and thereby be used to detect which, if any, of the duplex tubes is leaking.

7 Claims, 4 Drawing Figures

LEAK DETECTION SYSTEM FOR DUPLEX TUBE HEAT EXCHANGERS

BACKGROUND OF THE INVENTION

There are situations in industry where contact between two fluids exchanging heat must be prevented. For example, in nuclear power plants and in chemical plants, contact between certain fluids with exchange heat will result in unacceptable contamination. Further, there are fluids which if contact between them is permitted will cause a violent reaction. For this reason, in nuclear power plants, where sodium is used to heat water or steam it is essential that precautions be taken to prevent contact between the two fluids. The heat exchangers usually comprise one or more tube sheets which separate the primary from the secondary fluid and a number of tubes connected with the tube sheet so that one of the fluids can pass through the tubes and the other fluid over the tubes, to place the fluids in indirect heat exchange.

Since the fluids pass in closest proximity to each other at the tubes, it is common to use duplex tubes, that is, tubes having a double wall. In effect, each duplex tube is really two coaxial tubes since it has an inner wall, which is separate from the outer wall, over the area where both fluids contact the tube. With this arrangement, failure of one of the tube walls will not result in contact between the primary fluid and the secondary fluid because there will still be a wall between the fluids.

Associated with the problem of preventing leakage between the primary fluid and the secondary fluid is the problem of detecting leakage when it does occur. In a heat exchanger using duplex tubes, it is desirable to detect leakage through one of the walls of the duplex tube so that the fault can be detected before both walls fail.

It is highly desirable that the leak detection system not only indicate the presence of a leak, but also indicate where the leakage is occurring. Such a capacity assures the replacement, repair or plugging of the proper tube to thereby provide safe and efficient operation.

SUMMARY OF THE INVENTION

It is an object of the present invention to overcome drawbacks found in the prior art, such as those discussed above. Accordingly, a tube sheet connected with a number of duplex tubes is provided with a number of bores extending laterally through the tube sheet with each bore communicating with a number of channels and each channel communicating with an annular chamber communicating with the space between the inner and outer walls of a duplex tube and a test probe which can be inserted into a selected bore to collect leaking fluid from between the walls of a duplex tube.

DESCRIPTION OF THE PREFERRED EMBODIMENT

Figure 1:
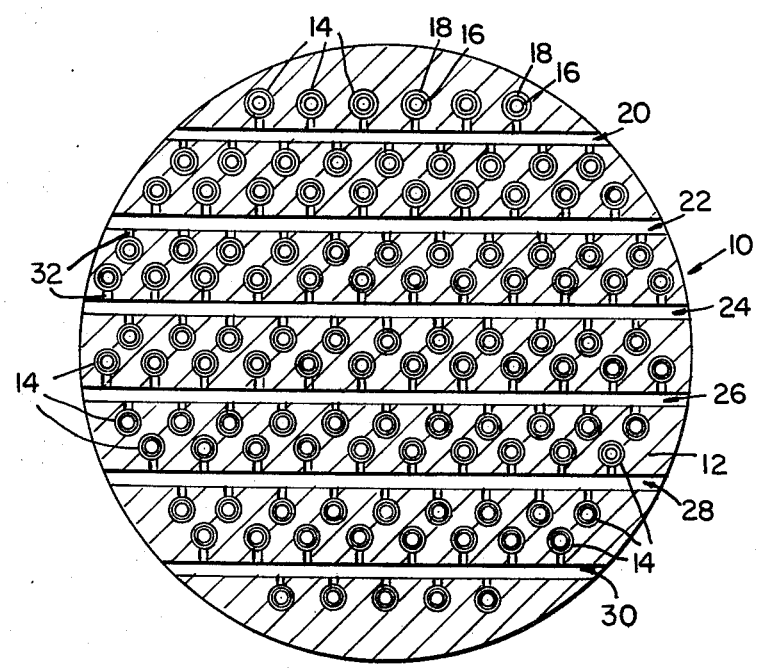
FIG. 1 is a plan view, partly in section, showing a heat exchanger, tube sheet and associated tubes made in accordance with the present invention.
Figure 2:
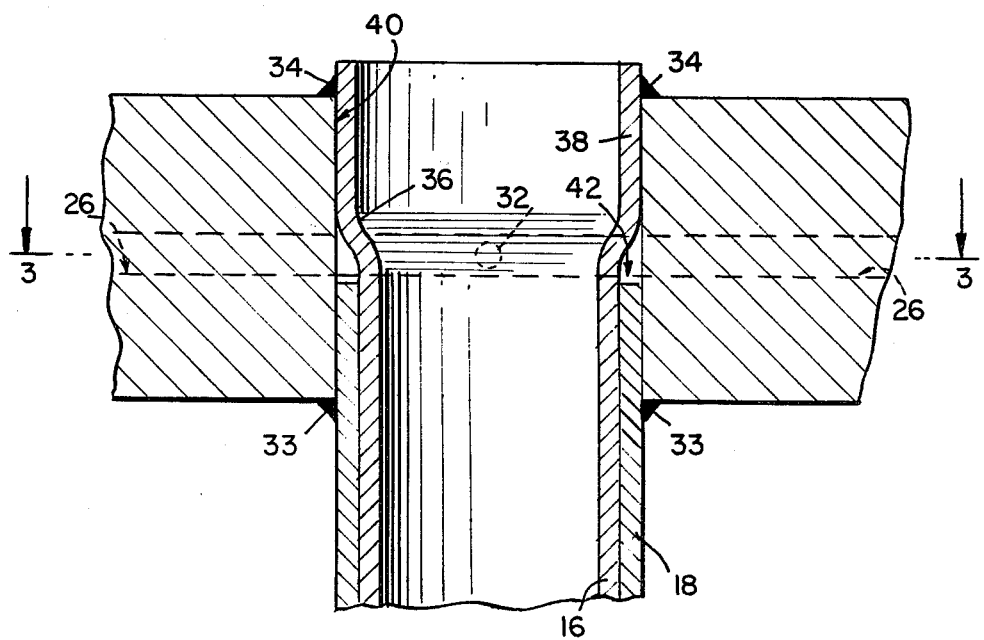
FIG. 2 is a view partly in section showing the connection between a tube sheet and a duplex tube.
Figure 3:
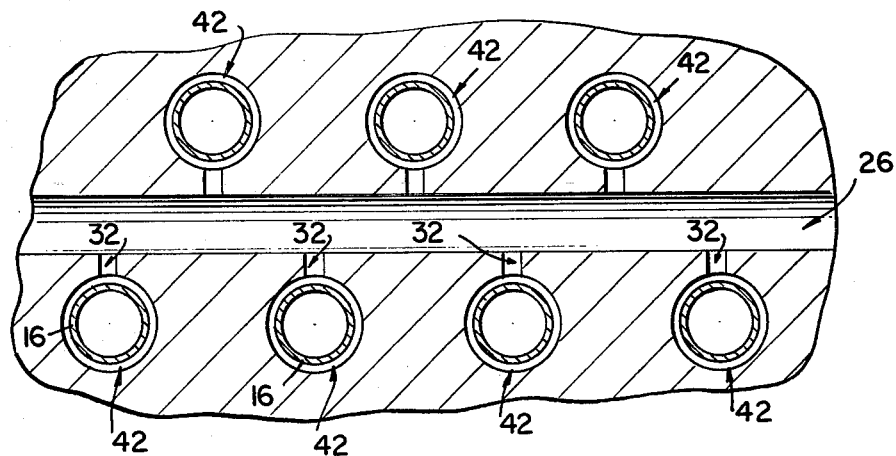
FIG. 3 is a top view partly in section showing how the duplex tubes communicate with a bore in the tube sheet.
Figure 4:
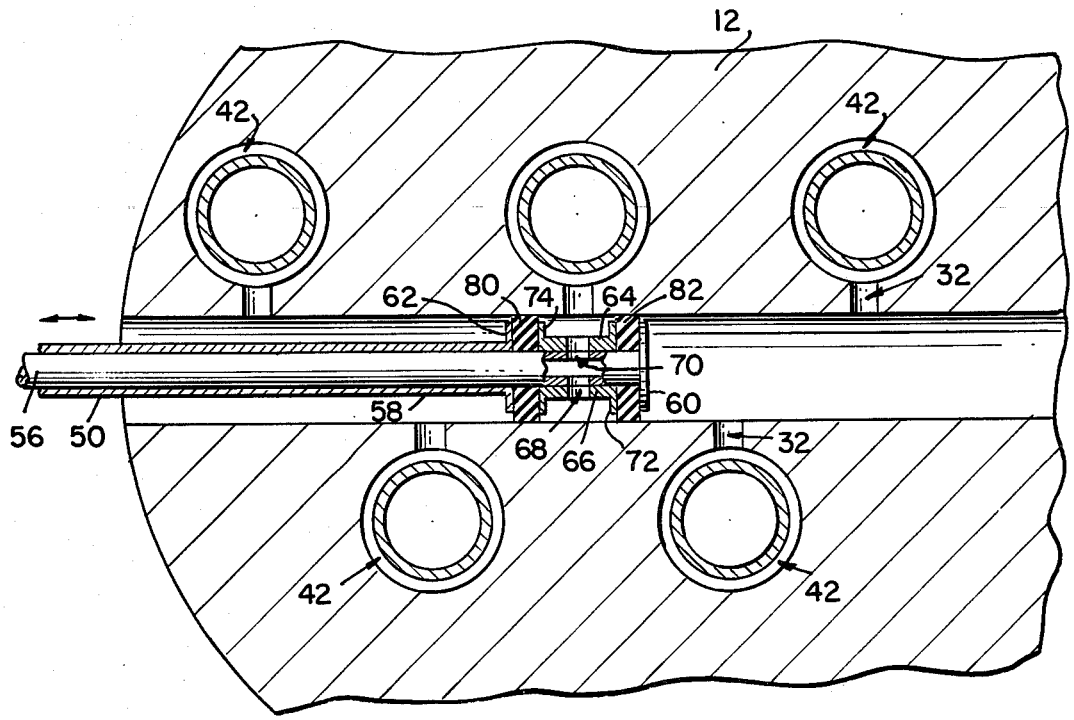
FIG. 4 is a top view partly in section showing a test probe being used to monitor a bore for leakage.

In FIG. 1 a tube sheet designed for the present leak detection system for duplex tube heat exchangers is shown. It is a top view partly in section of a tube sheet and portions of the associated tubes, which are indicated generally as 10. It comprises a tube sheet 12, which is connected to a number of heat exchange tubes 14. Each tube 14 is a duplex tube, that is, one which comprises an inner wall 16, and an outer wall 18 (FIGS. 2, 3, and 4). Thus, each duplex tube is in effect a pair of coaxial tubes in contact with each other over substantially their entire length.

The duplex tubes are arranged in straight rows and a number of cylindrical cavities or bores 20, 22, 24, 26, 28, and 30, pass laterally through the tube sheet so that the bores are parallel to the rows of tubes. The bores are arranged so that there is a row of tubes on either side of each bore.

FIG. 1 shows a number of channels 32, each of which extend between one of the duplex tubes 14 and a bore. Several channels 32 are shown better, perhaps, in FIGS. 2 and 3.

As shown in FIG. 2, the outer wall 18 does not extend entirely through the tube sheet, whereas, the inner wall 16 extends to a location adjacent to the opposite side of the tube sheet. The outer wall 18 is welded at 33 to the side of the tube sheet which contacts the fluid which does not flow through the duplex tubes 14. The inner tube 16 is welded at 34 to the opposite side of the tube sheet 12. The inner wall 16 has an end is flared outwardly at 36 so that the inner wall 16 portion 38, which engages against a tube hole 40. The end portion 38 may be of the same diameter as the outer tube 18 so that both the outer tube 18 at its end, and the inner tube 16 at its end portion 38 engage against the tube hole 40.

An annular collection chamber 42 is defined by the inner wall 16, and the outer wall 18, and the tube sheet 12, so that the chamber 42 is entirely within the tube hole 40. If there is leakage through either the inner wall 16 or the outer wall 18, the leaking fluid will migrate between the inner wall 16 and the outer wall 18, until it reaches the annular collection chamber 42.

The annular collection chamber 42 is connected to one of the channels 32 to communicate through that channel 32 with one of the bores 20, 22, 24, 26, 28, and 30.

FIG. 3 shows one of the bores, the bore 26. Each of the channels 32 shown in FIG. 3 places a collection chamber 42 in communication with the bore 26, so that if any of the duplex heat exchange tubes 14 should fail at its inner wall 16 or outer wall 18, the leaking fluid collected in the annular collection chamber 42 associated with the particular duplex tube, would flow through an associated channel 32 to the bore 26. Presence of fluid in the bore 26 indicates leakage of one of the tubes in the rows of tubes to either side of it. The presence of fluid will also show whether the leakage is through an inner tube 16 or an outer tube 18. This is so because if fluid which flows through duplex tubes is detected, a leakage through an inner wall is indicated, whereas, if the presence of fluid which flows over the duplex tubes is detected, leakage through an outer wall 18 is indicated.

Presence of leakage, as well as a determination of the particular fluid which has leaked, can be indicated by a suitable tester, not shown, such as a mass spectrometer communicating with one of the bores 20, 22, 24, 26, 28, and 30. In order to determine which tube is leaking, a probe 50 is used. In order to test one of the bores 22, 24, 26, 28, or 30 for leakage, the probe is inserted into the particular bore to be tested, as shown in FIG. 4. The probe 50 has a pipe 56 which extends through a sleeve 58. The pipe 56 is longer than the sleeve 58 and has secured to its end a flange 60, which is in the shape of a disk. An annular flange 62 is secured to the end of the sleeve 58, which is spaced from the ends of the pipe 56. Positioned between the flanges 60 and 62 is a ring 64 having a central portion 66 which encircles the pipe 56 between the flanges 60 and 62. One or more holes 68 in the central portion 66 communicate with one or more holes 70 in the pipe 56. At one end of the central portion 66 is an annular flange 72, and at the other end of the central portion 66 is a flange 74.

Positioned between the flange 62 and the flange 74 is an annular seal 80, which is of a deformable material, and an annular seal 82 of like material is placed between flanges 72 and 60. The pipe 56 extends through both of the annular seals 80 and 82. Thus, when the probe 50 is placed as shown in FIG. 4, and the pipe 56 and the sleeve 58 are moved relatively to one another so that the pipe 56 is moved to the left with respect to the sleeve 58. The flange 60 will be urged toward the flange 62 so that the seals 80 and 82 will be compressed between the flanges 62 and 74, and the flanges 72 and 60, respectively. Compression of the seals 80 and 82 will cause them to become thinner but to expand outward to tightly engage against the inside surface of the bore 26. This will create a closed pass so that any leaking fluid, which is in the collection chamber 42 of the particular tube 14 being tested, will flow through the channel 32 associated with that particular tube, the holes 68 and 70, and then through the pipe 56 and out the end of the probe 50.

Once it is determined that one of the bores 22, 24, 26, 28, or 30 is receiving leaking fluid, the probe 50 is moved axially along that bore so that each of the tubes on either side of the bore can be tested for leakage. The probe 50 is positioned so that one of the channels 32 is between the seals 80 and 82. The pipe 56 and the sleeve 58 are then moved relatively to one another to expand the seals 80 and 82 outward so that fluid in the channel 32 will pass into the pipe 56 and not the bore 26. The probe 50 is thus positioned at appropriate locations along the bore 26 so that each of the channels 32 can be placed in communication with the pipe 56 to determine whether or not a particular tube 14 is leaking.

Thus, the position of the probe 50 will indicate which tube 14 is leaking. The particular fluid which is detected will, as explained above, indicate whether it is the inner wall 16 or the outer wall 18 of that particular tube which has failed.

The foregoing describes but one preferred embodiment of the present invention, other embodiments being possible without exceeding the scope of the present invention as defined in the following claims.

What is claimed is:

1. In a heat exchanger in which a fluid is passed through a plurality of heat exchange tubes to place said fluid in indirect heat exchange with another fluid:
a plurality of heat exchange tubes, each having an inner wall and a coaxial outer wall encircling and engaging against said inner wall, said inner wall extending axially farther than said outer wall at one end of said heat exchange tubes,
a tube sheet connected to each of said heat exchange tubes at said one end of said tubes, and having a plurality of annular spaces, each encircling one of said heat exchange tubes between the ends of said inner wall and said outer wall apparent to said one end of said heat exchange tubes, said tube sheet having a plurality of bores extending laterally of said tube sheet, each of said bores communicating with a portion of said annular spaces;
a probe comprising:
    a pipe,
    a sleeve encircling said pipe,
    a first flange at one end of said pipe,
    a second flange at the end of said sleeve closest to said one end of said pipe,
    a ring encircling said pipe and positioned between said first flange and said second flange, said ring having holes substantially aligned with holes in said pipe,
    a first deformable seal between said first flange and said ring,
    a second deformable seal between said ring and said second flange,
wherein said probe can be moved axially along one of said bores so that one of said annular spaces communicates with the space between said seals, and said pipe and said sleeve can be manipulated so that said first flange is moved toward said second flange to compress said first deformable seal between said first flange and said ring, and to compress said second deformable seal between said second flange and said ring, whereby if the heat exchange tube associated with said annular space is leaking, the leaking fluid will flow into said annular collection chamber, through said holes in said ring and said pipe and along said pipe to a location lateral of said tube sheet.

2. The structure as defined in claim 1, further comprising a plurality of channels, each of said channels connecting for fluid communication one of said annular spaces with one of said bores.

3. The structure as defined in claim 1, further comprising a third flange and fourth flange, said third and fourth flanges being positioned on opposite ends of said ring so that said first deformable seal is positioned between said first flange and said third flange and said second deformable seal is positioned between said second flange and said fourth flange.

4. The structure as defined in claim 2, wherein said heat exchange tubes are arranged in straight rows which are parallel to said bores, and said channels extend perpendicular to said bores.

5. The structure as defined in claim 4, wherein each bore passes between and is parallel to two rows of said heat exchange tubes.

6. The structure as defined in claim 5, wherein said one end of each of said inner walls is of a diameter larger than the diameter of the remaining portion of said inner walls and substantially equal to the diameter of said outer walls, with said annular collection chambers each being positioned between the increased diameter portions of said inner walls and said end of said outer walls.

7. A probe for detecting the presence of fluid along the length of a bore comprising:
    a pipe,
    a sleeve encircling said pipe,
    a first flange at one end of said pipe, a second flange at the end of said sleeve closest to said first flange,
a ring encircling said pipe and positioned between said first flange and said second flange, said ring having a hole in said ring substantially aligned with a hole in said pipe,
a first deformable seal between said first flange and said ring,
a second deformable seal between said ring and said second flange; . wherein said probe can be moved axially along said bore, and the presence of fluid along said bore can be detected by moving said sleeve with respect to said pipe so that said first flange will move toward said second flange, and said deformable seals will be compressed between said flanges and said ring to be expanded outward so that any fluid in said bore between said seals will flow through said holes in said ring and said pipe and along said pipe.